(12) United States Patent  
Gaiser

(10) Patent No.: US 7,513,721 B2
(45) Date of Patent: Apr. 7, 2009

(54) DEBURRING TOOL

(75) Inventor: Gilbert Gaiser, Veringendorf (DE)

(73) Assignee: Jörg Gühring, Albstadt (DE)

( * ) Notice: Subject to any disclaimer, the term of this patent is extended or adjusted under 35 U.S.C. 154(b) by 59 days.

(21) Appl. No.: 11/005,095

(22) Filed: Dec. 6, 2004

(65) Prior Publication Data

US 2005/0163579 A1    Jul. 28, 2005

Related U.S. Application Data

(63) Continuation of application No. PCT/DE2004/001362, filed on Jun. 28, 2004.

(30) Foreign Application Priority Data

Jun. 27, 2003 (DE) ................. 103 29 187
Nov. 24, 2003 (DE) ................. 103 55 098

(51) Int. Cl.
*B23B 51/00* (2006.01)
(52) U.S. Cl. ...................... 408/156; 408/714
(58) Field of Classification Search ............. 408/154, 408/156, 157, 57, 59, 714, 99, 227; *B23B 51/00*
See application file for complete search history.

(56) References Cited

U.S. PATENT DOCUMENTS

| 2,657,597 | A | * | 11/1953 | Pickering et al. | ............. 408/200 |
| 3,217,570 | A | * | 11/1965 | Cogsdill | ...................... 408/229 |
| 3,230,798 | A | * | 1/1966 | Toth et al. | .................... 408/229 |
| 3,276,294 | A | * | 10/1966 | Kubicek | ...................... 408/199 |
| 3,298,256 | A | * | 1/1967 | Cogsdill | ...................... 408/226 |
| 3,377,890 | A | * | 4/1968 | Cogsdill | ...................... 408/229 |
| 3,411,386 | A | * | 11/1968 | Kubicek | ...................... 408/226 |
| 3,442,162 | A | * | 5/1969 | Cogsdill | ...................... 408/156 |
| 3,449,984 | A | | 6/1969 | Cogsdill | |
| 3,661,473 | A | * | 5/1972 | Kubicek | ................. 408/239 R |
| 3,827,821 | A | * | 8/1974 | Swenson | ...................... 408/59 |
| 4,333,727 | A | * | 6/1982 | Bennett | ...................... 408/191 |
| 5,417,525 | A | * | 5/1995 | Lenhart | ...................... 408/24 |
| 5,580,196 | A | * | 12/1996 | Thompson | .................. 408/145 |
| 5,755,538 | A | * | 5/1998 | Heule | .......................... 408/154 |
| 6,976,810 | B2 | * | 12/2005 | Helvey et al. | ................. 407/30 |
| 7,290,965 | B2 | * | 11/2007 | Gaiser et al. | ................ 409/132 |

FOREIGN PATENT DOCUMENTS

| EP | 1 075 888 A1 | | 2/2001 |
| JP | 2004142039 A | * | 5/2004 |
| WO | WO 96/04091 A1 | | 2/1996 |

* cited by examiner

*Primary Examiner*—Dana Ross
*Assistant Examiner*—Jamila Williams
(74) *Attorney, Agent, or Firm*—Burr & Brown

(57) ABSTRACT

A tool for deburring holes is proposed, comprising a basic body, which rotates about a rotation axis of the tool and has a clamping shank, and at least one lip holder elastically movable relative to the basic body, the lip holder comprising at least one cutting element which projects radially with respect to the rotation axis and has at least one lip leading edge oriented at least partly transversely to the cutting direction, which tool exhibits improved deburring and greater endurance compared with the prior art. This is achieved by the cutting element (8, 30, 31) being made of carbide.

19 Claims, 17 Drawing Sheets

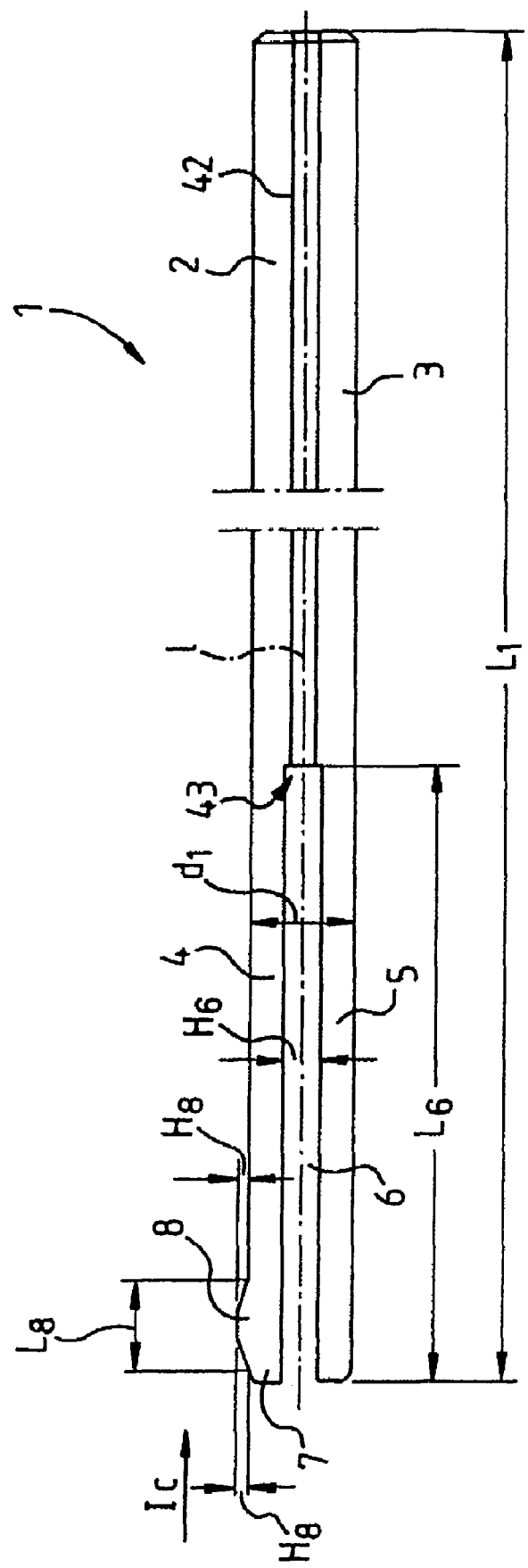

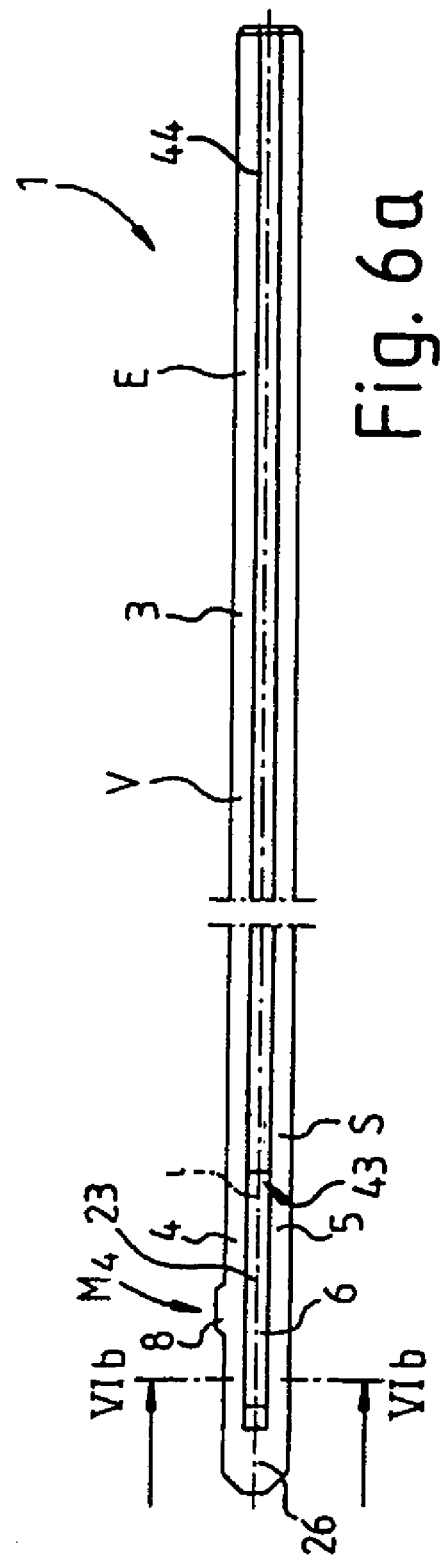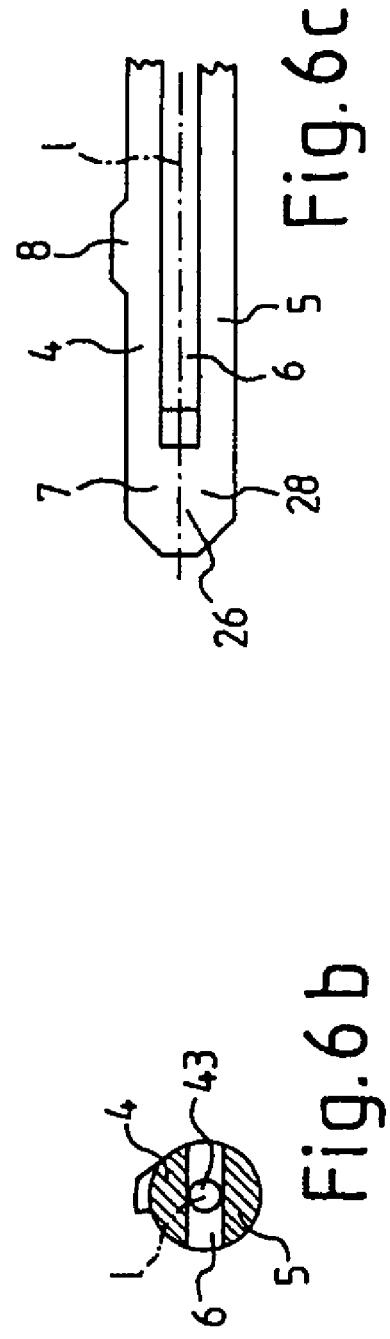

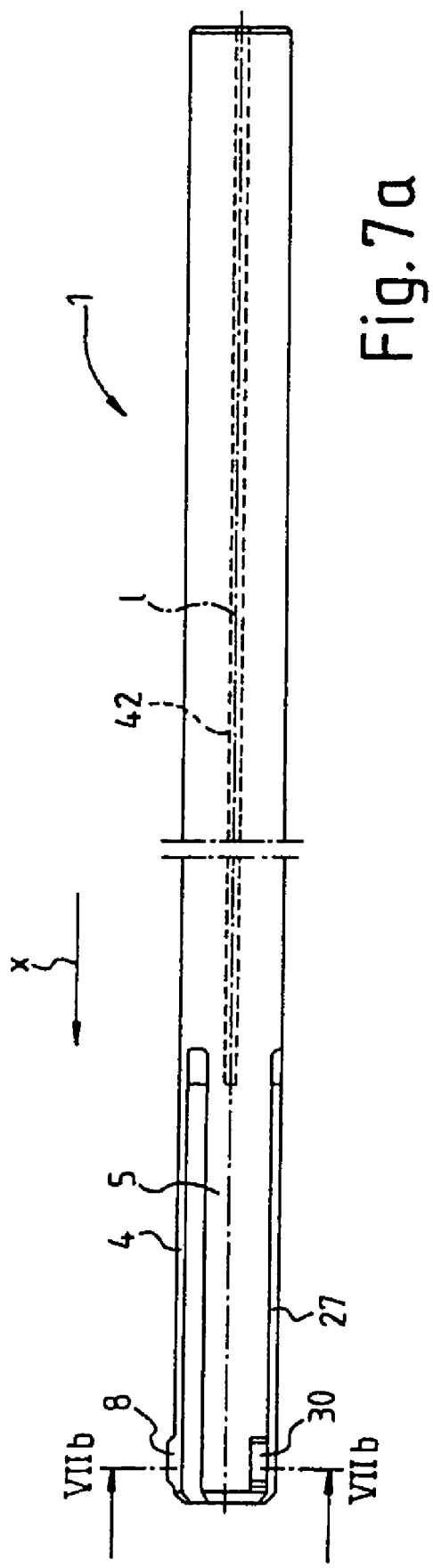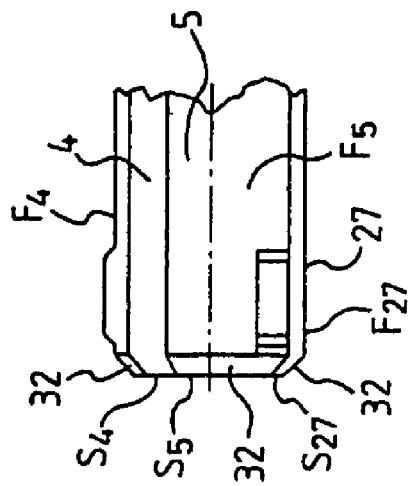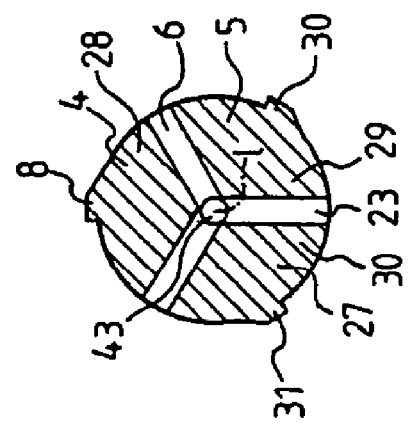

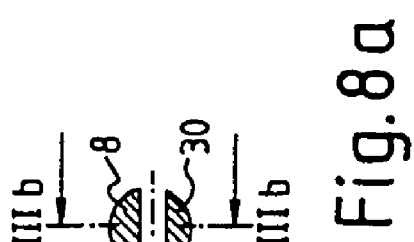
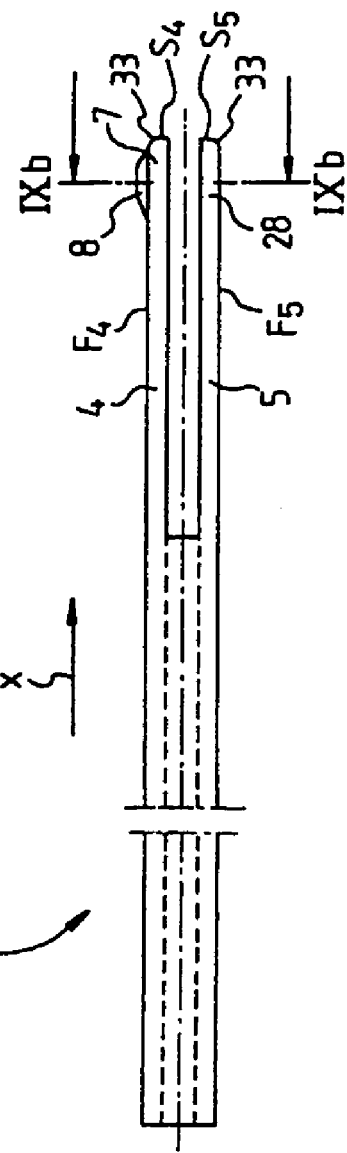
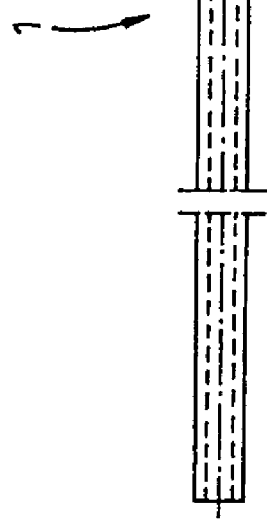
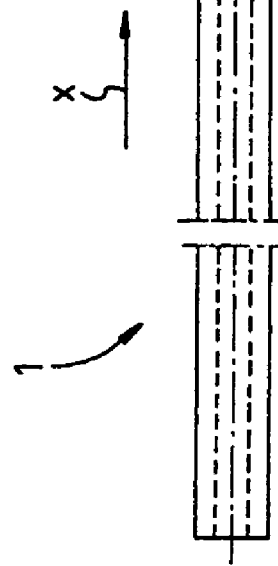
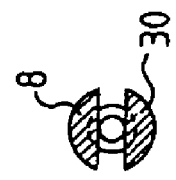

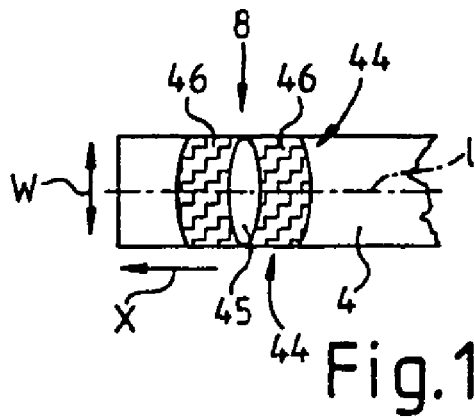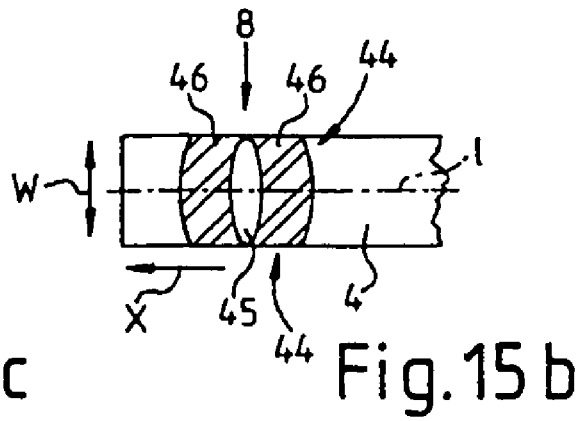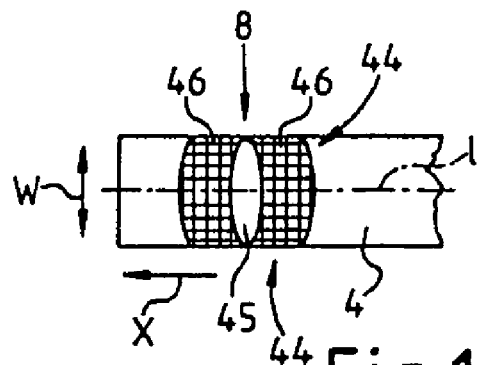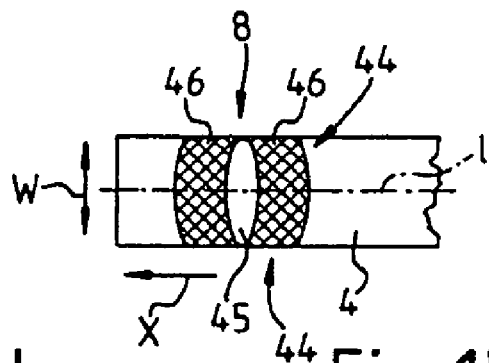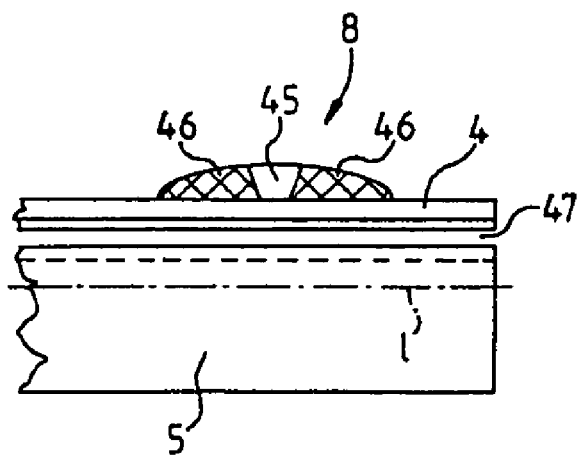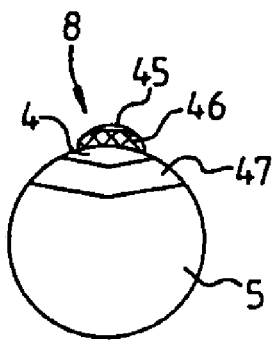

DEBURRING TOOL

CROSS REFERENCE TO RELATED APPLICATIONS

This application is a continuation of International Application No. PCT/DE2004/001362 having an international filing date of Jun. 28, 2004, which designate the United States, the entirety of which is incorporated herein by reference.

This application also claims the benefit of German Application No. 103 29 187.3, filed Jun. 27, 2003, and German Application No. 103 55 098.4, filed Nov. 24, 2003, the entireties of which are incorporated herein by reference.

BACKGROUND OF THE INVENTION

Field of the Invention

The invention relates to a tool for deburring holes

To deburr the start and the end of a hole on both sides, it is known to use a tool which has a basic cylindrical body, which comprises, at one end, two lip holders or spring arms, which can move elastically toward one another. A cutting element is arranged on each of the spring arms. This cutting element projects radially and holds two lips having two cutting edges, which in each case run at an angle to a plane disposed perpendicularly to the tool axis and form an angle with one another. Such a tool is offered, for example, by Scharmann under the name "BURR-ZIT". Such tools are made of HSS. A disadvantage with the tools known from the prior art is that they are subjected to relatively high wear, in particular during the machining of steel, and therefore have a short service life.

SUMMARY OF THE INVENTION

The object of the invention is to propose a deburring tool which exhibits improved deburring and longer tool life compared with the prior art.

A tool according to the invention is distinguished by the fact that a cutting element of carbide is provided. Compared with a tool having a cutting element or cutting member of HSS, this provides for increased endurance, or the machining of harder materials is possible as a result. Furthermore, a corresponding tool permits greater cutting speeds and thus also enables machining times to be reduced. The service life can again be increased, if the carbide cutting element holds lips of PCD.

Furthermore, provision is preferably made for the lip holder or lip holders, also referred to below as spring arms, to be formed from carbide. In this way, it is possible to bring the tool up against the workpiece to be machined with greater pressure.

A preferred variant of the invention provides for the tool to be formed from carbide as a one-piece tool. Such a tool can be produced with few production steps and allows even greater pressure to be exerted on the workpiece to be machined, so that the capacity of the cutting member can be fully utilized.

In principle, the basic body of the tool according to the invention may have, for example, a round, rectangular, hexagonal or other polygonal cross section. However, a basic body designed as a cylindrical body is preferably used.

In general, a lip holder may be provided which is arranged on one side on the basic body, and its free end can be moved or adjusted essentially elastically transversely to the rotation axis. A lip holder fixed on one side on the basic body may be designed, for example, as a cantilever or spring arm. Due to the one-sided mounting with a freely elastic front end, it is possible, even with comparatively short spring arms, to realize relatively large amplitudes in the region of the lip holder and thus also achieve the desired spring displacements when using rigid materials.

In an alternative variant according to the invention, the lip holder may be fixed in a bridge-like manner at both ends, a center region of the lip holder being elastically resililent relative to the basic body radially with respect to the longitudinal axis of the rest of the basic body. In the case of lip holders correspondingly fixed on two sides, the cutting element is advantageously arranged in the center region of such a bridge element.

In an advantageous variant of the invention, the lip leading edge is oriented at least partly in the direction of a tool head, i.e. against the direction pointing to the clamping end or shank. This measure ensures that the lip leading edge can deburr the hole when adjusting the tool along the rotation axis in the direction of the workpiece. Inter alia, blind holes can be advantageously deburred in this way. For example, the lip is advantageously arranged in an angular manner and along the rotation axis in such a way that the lip leading edge deburrs the hole on one side of the workpiece.

Alternatively, or in combination with the aforesaid variant, the lip leading edge, in a special development of the invention, is oriented at least partly in the direction of the clamping end or the shank. This ensures that undercutting of the hole or of the workpiece can be realized. That is to say that the tool can be directed at least partly through the hole and, in particular during the retraction of the tool, deburrs the hole or the workpiece on the rear side. For example, this lip and/or a second lip are/is advantageously arranged in an angular manner and along the rotation axis in such a way that this lip enables the workpiece to be deburred on the rear side when the cutting element passes completely through the hole and in particular during the subsequent retraction of the tool in the longitudinal direction of the rotation axis.

In a special embodiment of the invention in which at least one lip leading edge is oriented at least partly in the direction of the shank and at least one lip leading edge is oriented at least partly against the direction of the shank, both the front side and the rear side of the workpiece can thus be deburred.

The tool may be advantageously provided with at least two lip holders. In a special variant of the invention, the lip holders are mounted on the shank and are connected to one another in the region of their front ends. As a result, the tool is stabilized with regard to high loads, which may also occur, for example, through improper use. Each lip holder forms a type of bridge mounted on two sides or an elastic element mounted on two sides. The lip holders are mutually damped due to their coupling in the region of their front ends.

The lip holders are preferably formed in one piece in the region in which they are connected to one another. However, it is also possible to braze, weld or adhesively bond a connecting web in place. These constructions permit simplified production of the tool or material combinations.

In general, the tool according to the invention may have a single lip holder with one cutting element as well as a plurality of lip holders with a respective cutting element. Two lip holders with one cutting element each are preferably provided, the cutting elements being arranged essentially on opposite sides of the tool, if need be diametrically opposite one another as viewed in section. The two lip holders are preferably spaced apart in such a way that a mainly radial movement or adjustment of the lip holders or cutting elements can be advantageously realized. For example, the lip holders are spaced apart by means of a recess, the recess preferably being arranged in the region of the rotation axis or in the center region of the tool relative to the cross section. Recesses or the like arranged eccentrically may also be advantageous for certain applications. This is advantageous in particular in the case of tools for larger hole diameters, e.g. larger than approximately 10 mm. In this case, the advantageous elasticity of the lip holder(s) can also be ensured.

In addition, a recess formed largely rectilinearly transversely to the rotation axis or a recess of angled design can be provided. With an angled recess which is V- or L-shaped, for example as viewed in the longitudinal direction of the tool, a cross section of the lip holder can be produced which deviates from a circular cross section, a factor which is advantageous for certain applications.

Especially smooth running of the tool is achieved if the tool has in particular three lip holders or spring arms and if preferably each lip holder or spring arm holds a cutting element or cutting member, since the loading is then distributed uniformly over the circumference of the tool.

In principle, according to the invention, one or more lip holders with a respective cutting element may also be provided in combination with at least one arm or the like without a cutting element. For example, one lip holder with a cutting element and one arm or holder without a cutting element which are advantageously spaced apart are provided.

The lip holders with a respective cutting element are preferably arranged in a radially symmetrical manner, so that especially uniform stressing of the cutting elements or the lip edges can be realized. For example, three lip holders with a respective cutting element are provided, the cutting elements or the lip leading edges of the cutting elements being arranged approximately at an angle of 120 degrees to one another relative to the rotation axis.

In general, the cutting element may be arranged or fixed as a separate cutting element on the lip holder. On the other hand, the cutting element may be designed as a shaped portion of the lip holder and/or the cutting member may be formed in one piece with the lip holder.

An advantageous design of the subject matter of the invention provides for the tool, which is also referred to here as deburring fork, to be provided with a radially projecting cutting element which has a circumferential lateral surface which has a straight or spiral-like profile relative to the longitudinal axis of the deburring fork in section perpendicularly to the tool longitudinal extent, the radius between longitudinal axis and lateral surface or the tangential angle at the lateral surface continuously increasing against the rotation direction of the deburring fork. In this way, smooth spring deflection of the prong of the deburring fork, this prong being fitted with the cutting element, which is also referred to as cutting member, is possible when the cutting member completely enters a hole, so that an abrupt movement, overloading the carbide, of the prong toward the longitudinal axis is avoided.

Furthermore, embodiments of the invention provide for the lips to be provided with a negative or positive rake angle. This produces a lip or cutting edge where there is no risk of this lip or cutting edge penetrating the workpiece to be machined or of said lip or cutting edge running unsteadily.

It is advantageous to arrange the specially designed lateral surface between the lips. As a result, the lateral surface develops its effect both when the deburring fork plunges into the workpiece after the deburring with the first lip and when the deburring fork is retracted from the tool after the deburring with the second lip.

It is advantageous if the lateral surface is oriented at least partly parallel to the tool axis. This ensures that the spring deflection of the prong fitted with the cutting body produces approximately comparable loads on the deburring fork when the latter plunges in and is retracted. Likewise, the lateral surface in the case of somewhat oval holes leads to smooth spring deflection and rebound or oscillation of the lip holder or spring arm during the rotation.

Furthermore, it is advantageous if the lips enclose an at least approximately identical but opposed angle relative to the axis of the tool. This likewise produces comparable loading of the deburring fork when the latter plunges in or is being retracted. This also ensures uniform wear of the two lips.

Provision is made in particular for the angles enclosed by the lips relative to the longitudinal axis of the tool to be formed within a range of 10° to 65° and in particular for 20° to 40° to be provided.

Furthermore, it is proposed according to the invention, for example, for lips which have a clearance angle which lies approximately within the range of 2° to 12° to be formed on the cutting element. This prevents the flank from rubbing on the workpiece when peeling off a relatively large chip.

An advantageous embodiment of the subject matter of the invention provides for two spring arms to be formed on the tool. In such a design, even tools for smaller hole diameters have sufficient space on the respective spring arm for the arrangement of a cutting body.

A modification of the subject matter of the invention provides at least three spring arms which at least partly have a cutting member. In this way, in particular in the case of larger hole diameters, approximately >5 mm, it is possible to distribute the cutting work over a plurality of lips and thus reduce the loading of the individual lip in order to achieve as long a service life of the tool as possible.

At least one cooling arrangement for cooling the tool is advantageously provided. By means of this measure, adverse heating of the tool on account of the machining of a hole or of the workpiece can be advantageously minimized or completely prevented. The cooling arrangement preferably comprises a cooling fluid, such as, for example, a cooling liquid and/or cooling air, which is used for cooling the tool and in particular for cooling the cutting element(s) or the lip holder(s).

The tool preferably has a feed arrangement for feeding the cooling fluid to the cutting holder(s) and/or the cutting element(s). The feed arrangement preferably has a cooling line. In a special development of the invention, the cooling line of the cooling arrangement comprises at least one outlet opening in the region of the cutting element. In this way, the cooling of the cutting element(s) can be advantageously realized. For example, the advantageous cooling fluid comes out of the outlet opening, so that precise cooling of the tool is possible at the regions heated by the cutting operation.

The cooling line is advantageously designed as a cooling passage. A cooling passage correspondingly designed to be at least partly open permits especially simple production of the feed arrangement according to the invention for the cooling fluid.

Especially effective cooling of the tool in the region of the cutting edges can be achieved by a central cooling passage which runs parallel to the longitudinal axis of the tool in the region of the shank and opens into the slot between the spring arms.

An advantageous embodiment variant of the subject matter of the invention provides for a cooling passage to be arranged in at least one spring arm. This makes possible a further increase in the cutting capacity and thus in the working speed of the tool.

A special embodiment variant of the subject matter of the invention provides for the cooling line to be provided with an outlet opening lying in the region of the lips. As a result, the cooling medium can be fed in a purposeful manner.

Furthermore, a special variant of the invention provides for the use of carbides of the class K20 or K40 according to ISO 513 for producing the tool. These are in particular carbides having a grain size of 0.5 to 0.7 μm and a minimum bending strength of about 3200 to 3700 Mpa. Through the use of such materials, spring deflection of the spring arm or arms is possible without damaging the tool.

Provision is advantageously made for the lip holder(s) and/or holder(s) to be inserted into holes of the shank and in particular for said lip holder(s) to be brazed in place there. This makes it possible to produce a tool from different materials in a simple manner, the tool having, for example, a shank of steel and a lip holder or spring arm of carbide.

The lateral surface of the cutting member is preferably produced by means of a swing-frame grinding process. This permits in particular the true-to-size production of cutting members on tools for hole diameters <10 mm.

In a variant according to the invention, provision is made for the tool to be of multi-piece construction, the tip, which comprises the spring arm, essentially forming a first part, which is followed by a further part formed by the center part of the shank and finally by a third part which is formed by the end region of the shank, and the three parts in particular being made of different materials and in particular being connected to one another by different joining techniques. This makes it possible to optimally design each part or section of the tool with regard to its specific loading or to use cost-effective materials in regions subjected to less stress. Furthermore, tools of different length can be efficiently produced by using center pieces of different length. In particular, a push-in connection between the extension piece and the fork or the spring arms produces a tool in which the wearing parts can be exchanged in a simple manner and thus the entire shank, which consists of the extension piece and the clamping end, can continue to be used.

A special embodiment of the subject matter of the invention provides for at least the lip holder(s) or the tip of the tool to be sheathed with a mechanically resistant coating. In this way, its wear resistance can be increased in a simple manner.

In addition to diamond, for example titanium nitride or titanium aluminum nitride is also suitable for the mechanically resistant coating. Especially suitable are, inter alia, a titanium aluminum nitride coating and a "multilayer coating" which is marketed under the designation "Fire I" by Gühring oHG. This is a TiN—/(Ti, Al) N multilayer coating.

In an especially preferred manner, an anti-wear coating may also be used, this anti-wear coating essentially comprising nitrides with the metal components Cr, Ti and Al and preferably a small proportion of elements for grain refinement, the Cr proportion being around 30 to 65%, preferably 30 to 60%, in particular preferably 40 to 60%, the Al proportion being around 15 to 35%, preferably 17 to 25%, and the Ti proportion being around 16 to 40%, preferably 16 to 35%, in particular preferably 24 to 35%, to be precise in each case relative to all the metal atoms in the entire coating. In this case, the coating build-up may be single-layer with a homogenous mixing phase, or it may consist of a plurality of layers homogenous per se which consist alternately, on the one hand, of $(Ti_xAl_yY_z)N$, where $x=0.38$ to $0.5$ and $y=0.48$ to $0.6$ and $z=0$ to $0.04$ and, on the other hand, of CrN, the uppermost layer of the anti-wear coating preferably being formed by the CrN coating.

According to an embodiment variant, provision is made for the tool to be designed as a right-hand and/or left-hand cutting tool. With such a tool it is possible to continue production without a tool change if tool wear is established. To this end, it is merely necessary to change the rotation direction of the tool. Especially long service life can thus be achieved with such tools.

With regard to simple production of the tool, it is especially advantageous to provide a right-hand and a left-hand cutting element on the tool, this cutting element also being referred to as cutting member.

Furthermore, provision is made to provide the tool with a cutting member which has both right-hand cutting and left-hand cutting properties. Such a tool is of especially compact construction.

It is especially advantageous if the lip leading edge is arranged on the spring arm obliquely or helically relative to the longitudinal axis of the tool. In this way, especially effective guidance of the tool in the hole and especially smooth running of the tool can be achieved.

Furthermore, provision is advantageously made for the transition from a lateral surface of the spring arm into an end face of the spring arm to be provided with a bevel and/or to form this transition over a radius of, in particular, 0.1 mm to 100 mm. This enables the tool to plunge smoothly into the hole to be machined.

A special development of the invention provides for at least one of the lip holders or spring arms to be oriented with its free end in the feed direction. A tool designed in this way also allows, for example, the deburring of shallow blind holes, since the cutting element or elements or cutting member or members are arranged in the region of the tip or the front end of the tool.

An embodiment of the invention which is in particular an alternative to the aforesaid development provides for at least one of the spring arms to be oriented with its free end in the direction of the shank. A tool designed in this way is especially insensitive to undesirable loads at the tip, since the free ends of the spring arms are set back relative to the tip.

A connecting piece for connecting at least two lip holders or spring arms is advantageously provided, this connecting piece being designed, for example, as a screw, a grub screw, etc. This enables the effective diameter of the tool to be influenced by tighter or looser bracing of the free ends of the lip holders or spring arms and enables the tool to be adjusted or readjusted if required.

In a tool according to the preamble of claim 1, at least two lip leading edges, designed for the rotation direction, of the cutting element are advantageously arranged one behind the other at least partly in the rotation direction. This embodiment also advantageously achieves the object according to the invention. In addition, this variant can be combined in any desired manner with the embodiments mentioned above or below.

By means of the arrangement according to the invention of at least two lips in the rotation direction and associated lip leading edges on the cutting element, the stressing of the lip leading edges during the deburring operation is advantageously reduced, so that the service life of the tool is decisively increased compared with the prior art.

In the prior art, the two lips are arranged in an angular manner and along the rotation axis, so that in each case a lip leading edge deburrs the hole on one side of the workpiece. The first lip deburrs when plunging into the hole. The second lip is provided and appropriately arranged for enabling the workpiece to be deburred on a rear side by said second lip when the cutting element passes completely through the hole and the tool is subsequently retracted in the longitudinal direction of the rotation axis.

In this variant of the invention, it does not matter as other applications are also to be included in which only one side of the workpiece is to be deburred or the hole is to be deburred, for example, only on the rear side. In this case, with the arrangement according to the invention of the lip leading edges, uniform stressing is ensured during each deburring operation. Contrary to the prior art, point-like loading at the circumference irrespective of the deburring operation on the front and/or rear side of the workpiece is avoided.

In an advantageous variant of the invention, lip leading edges are oriented at least partly in the direction of a tool head, i.e. against the direction pointing toward the clamping end or shank. This measure ensures that the lip leading edges can deburr the hole when adjusting the tool along the rotation axis in the direction of the workpiece.

Alternatively, or in combination with the aforesaid variant, in a special development of the invention, lip leading edges are oriented at least partly in the direction of the clamping end or shank. This ensures that undercutting of the hole or of the workpiece can be realized. That is to say that the tool can be directed at least partly through the hole and deburrs the hole or the workpiece on the rear side in particular when the tool is moved back.

In a special embodiment of the invention in which lip leading edges are oriented at least partly in the direction of the shank and at least partly against the direction of the shank, at least four lip leading edges are provided according to the invention. That is to say at least two lip leading edges point in the direction of the shank and two lip leading edges point against the direction of the shank. A correspondingly advantageous tool can therefore deburr both the front side and the rear side of the workpiece.

At least one cutting section of one of the lip leading edges is advantageously oriented at least partly along the rotation direction. This ensures that cutting or deburring of the workpiece or of the hole is advantageously possible during an adjustment or movement of the tool in the direction of the rotation axis.

If need be, the cutting section is oriented essentially along the rotation direction. In this variant of the invention, cutting sections are therefore to be provided along the cutting direction and also transversely to the cutting direction.

In a preferred embodiment of the invention, lip leading edges are oriented essentially at an acute cutting angle to the rotation direction. For example, lip leading edges of partly wavelike and/or rectilinear design which run obliquely or helically relative to the rotation axis are provided.

An intersecting course of the lips for a machining direction with in particular in each case a plurality of lips is advantageously provided. Correspondingly intersecting lips can be produced in an especially simple manner using already known methods. The intersecting lips produce, for example, a rectangular or diamond pattern.

In an advantageous embodiment of the invention, lip leading edges are arranged at least partly on a curved lateral surface section of the cutting element. For example, the lateral surface section can be designed to be curved or arched in such a way that the lip leading edges advantageously extend over a radial distance from the rotation axis, so that unevenness or out-of-roundness of the hole cannot lead to any impairment of the deburring and/or can lead to an improvement in the roundness of the hole. This is especially advantageous in the case of burrs which are formed unevenly relative to the radius from the hole center. Correspondingly out-of-round burrs can easily be advantageously removed according to the invention. In addition, the arching may be formed along the tool longitudinal extent in order thus to create sections for the deburring of a front and rear side. For example, the arching increases in the tool longitudinal extent up to a sliding region, which is described in more detail further below, and then falls away again after the latter.

In a preferred variant of the invention, a multiplicity of lip leading edges arranged one behind the other at least partly in the rotation direction are provided. This measure ensures that the service life of the tool can be markedly improved even further. For example, more than ten cutting edges arranged one behind the other in the rotation direction are provided.

In an advantageous embodiment of the invention, a multiplicity of lip leading edges arranged one behind the other at least partly transversely to the rotation direction are provided. This enables the stress or the wear of the lip leading edges or of corresponding cutting sections, during the adjustment or movement of the tool in the direction of the rotation axis, to be reduced or to be distributed over the numerous lip leading edges. Accordingly, the action and the service life are improved even for combined movements of the tool during the deburring operation.

A sliding region, projecting radially with respect to the rotation axis, of the cutting element is advantageously provided for sliding in the hole. A corresponding sliding region prevents impairment of the hole in the workpiece by the penetration of the tool. The sliding region advantageously has no cutting edges.

The sliding region is preferably arranged between two curved lateral surface sections having lip leading edges. The two lateral surface sections, spaced apart, for example, by the sliding region, are advantageously designed in such a way that one lateral surface section is oriented at least partly in the direction of the shank and one lateral surface section is oriented against the direction toward the shank. That is to say that one lateral surface section is provided for deburring the hole on the front side of the workpiece and one lateral surface section is provided for deburring the hole on the rear side of the workpiece.

Further details of the invention are described in the drawing with reference to schematically shown exemplary embodiments.

BRIEF DESCRIPTION OF THE DRAWINGS

FIG. 1a shows a schematic cross section of a tool according to the invention,

FIG. 1b shows a detailed view of the tool shown in FIG. 1a,

FIGS. 6a-6c show a tool in which lip holders are connected by a web, FIGS. 7a-7c show a tool having three spring arms and a central cooling passage, FIGS. 8a-8b show a tool having rounded-off cutting members, FIGS. 9a-9b show a tool having two spring arms and one cutting member, FIGS. 15a-15d show schematic variants of the arrangement of a multiplicity of lip leading edges, and FIG. 16 shows a further, schematic variant of the tool according to the invention having an eccentrically arranged slot between a lip holder and an arm.

DETAILED DESCRIPTION OF THE INVENTION

Figure 1B:
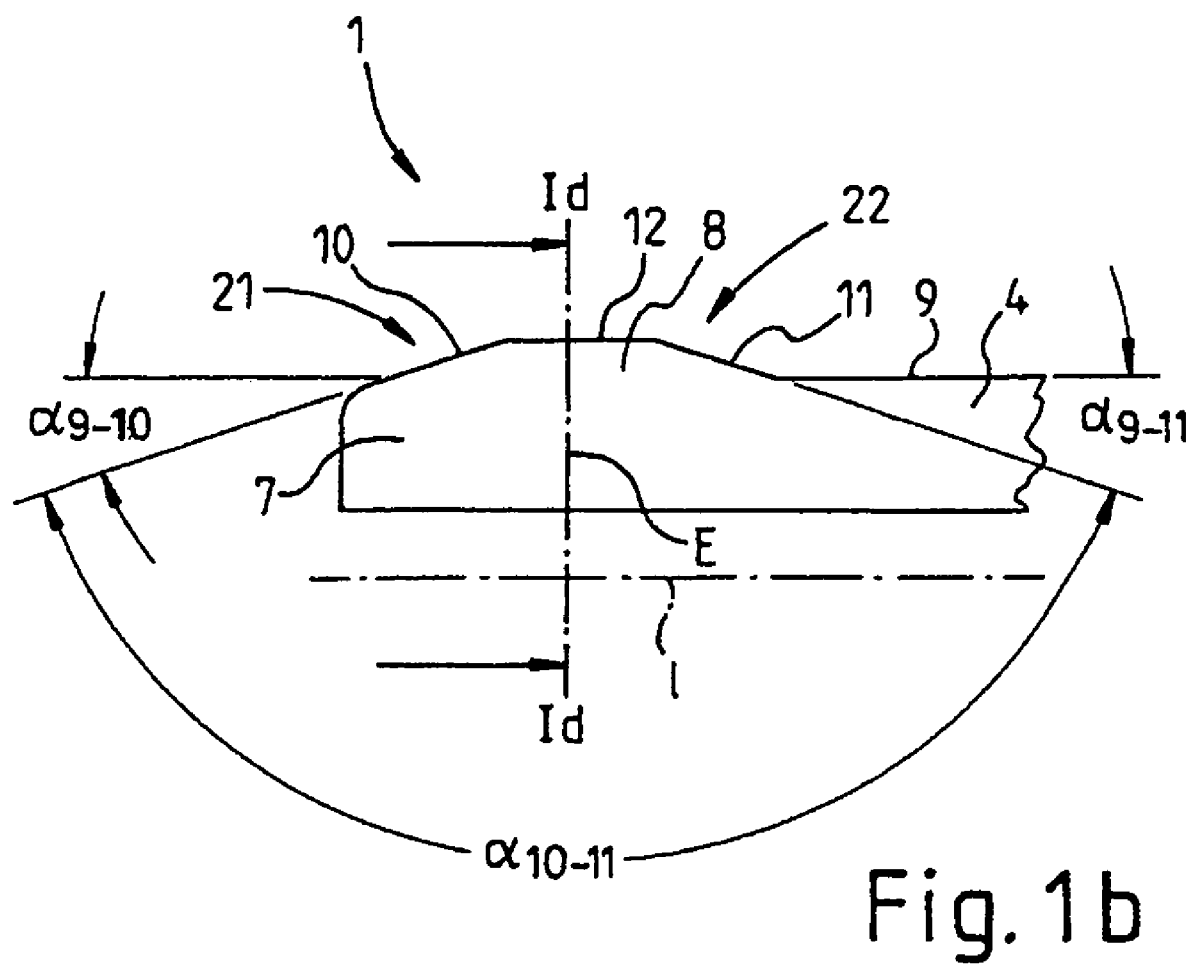

A tool 1 is shown in longitudinal section in FIG. 1a. The tool 1 essentially comprises a cylindrical body 2 which is formed as a shank 3 in a first region and has two spring arms 4 and 5 in a second region. The spring arms 4 and 5 are formed by a slot 6 running in the direction of a longitudinal axis l of the cylindrical body. A cutting member 8 is arranged on a free end 7 of the spring arm 4. At a diameter $d_1=4.4$ mm, the tool 1 has an overall length $L_1=100$ mm, the slot 6 then having a length of $L_6=27$ mm and a height $H_6$ of 1.5 mm. The associated cutting member 8 has a length $L_8$ of 4 mm and a height $H_8$ of 0.45 mm. The body 2 has a closed cooling line 42 with a cooling opening 43.

The free end 7, shown in FIG. 1a, of the spring arm 4 is shown enlarged in FIG. 1b. The cutting member 8 rises above a cylindrical circumferential surface 9 of the spring arm 4 and is characterized by two cutting edges 10 and 11 or by two lips 21 and 22 formed by said cutting edges 10 and 11, respectively, which rise from the circumferential surface 9 to a lateral surface 12 of the cutting member 8. The lips 10 and 11 run relative to the circumferential surface 9 of the spring arm 4 or relative to the longitudinal axis l of the tool 1 at angles $\alpha_{9-10}=\alpha_{9-11}$ of about 15° to 25°. The lips 10 and 11 together enclose an angle $\alpha_{10-11}$ of about 130° to 150°. In other words, the cutting edges 10 and 11 are inclined relative to a plane E which runs perpendicularly to the longitudinal axis l of the tool 1.

Figure 1C:
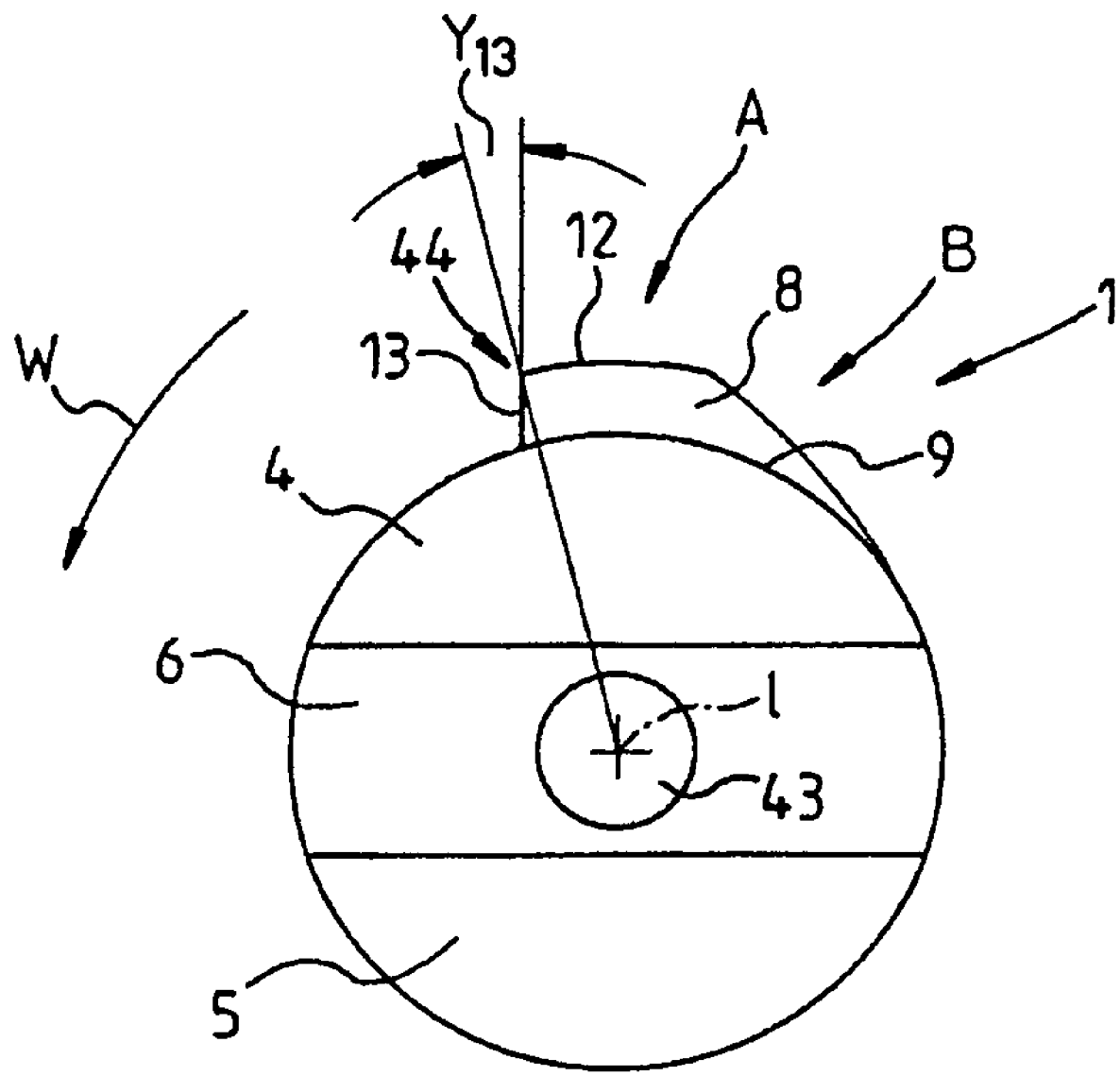
FIG. 1c shows a schematic front-end view from arrow direction Ic of the tool shown in FIG. 1a, FIG. 1d shows a cross section through the tool shown in FIG. 1b along section line Id-Id.

Depicted in FIG. 1c from arrow direction Ic is a side view of the tool 1 shown in FIG. 1a. The slot 6 is arranged between the spring arms 4 and 5 symmetrically to the longitudinal axis l of the tool 1. In side view, the cutting member 8 has a lug-like embossment.

Following an end cutting face 13 against a rotation direction w is the lateral surface 12, which runs in a first section A at the same or an increasing distance from the cylindrical circumferential surface 9 of the spring arm 4. In a second section B, the lateral surface 12 again runs toward the circumferential surface 9 of the spring arm 4 and merges into the latter. The cutting face has a negative rake angle $\gamma_{13}$, which is approximately within the range of 4° to 8°.

Figure 1D:
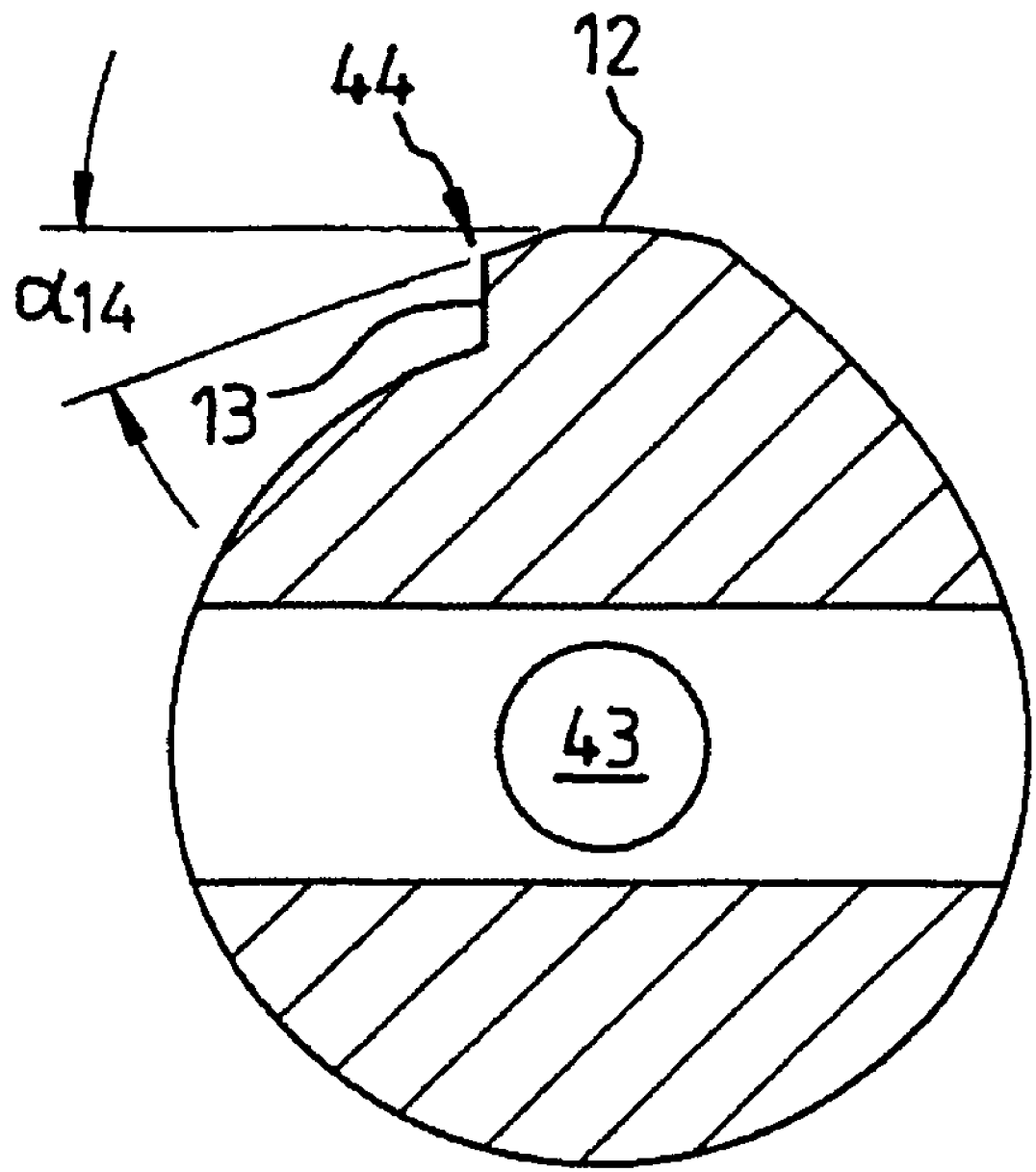

A section along section line Id-Id shown in FIG. 1b through the tool 1 in the region of the cutting member 8 is shown in FIG. 1d. The transition from the cutting face 13 into the lateral surface 12 is effected via a chamfered edge 14, which is preferably chamfered at an angle $\alpha_{14}$ of about 20°.

Figure 2:
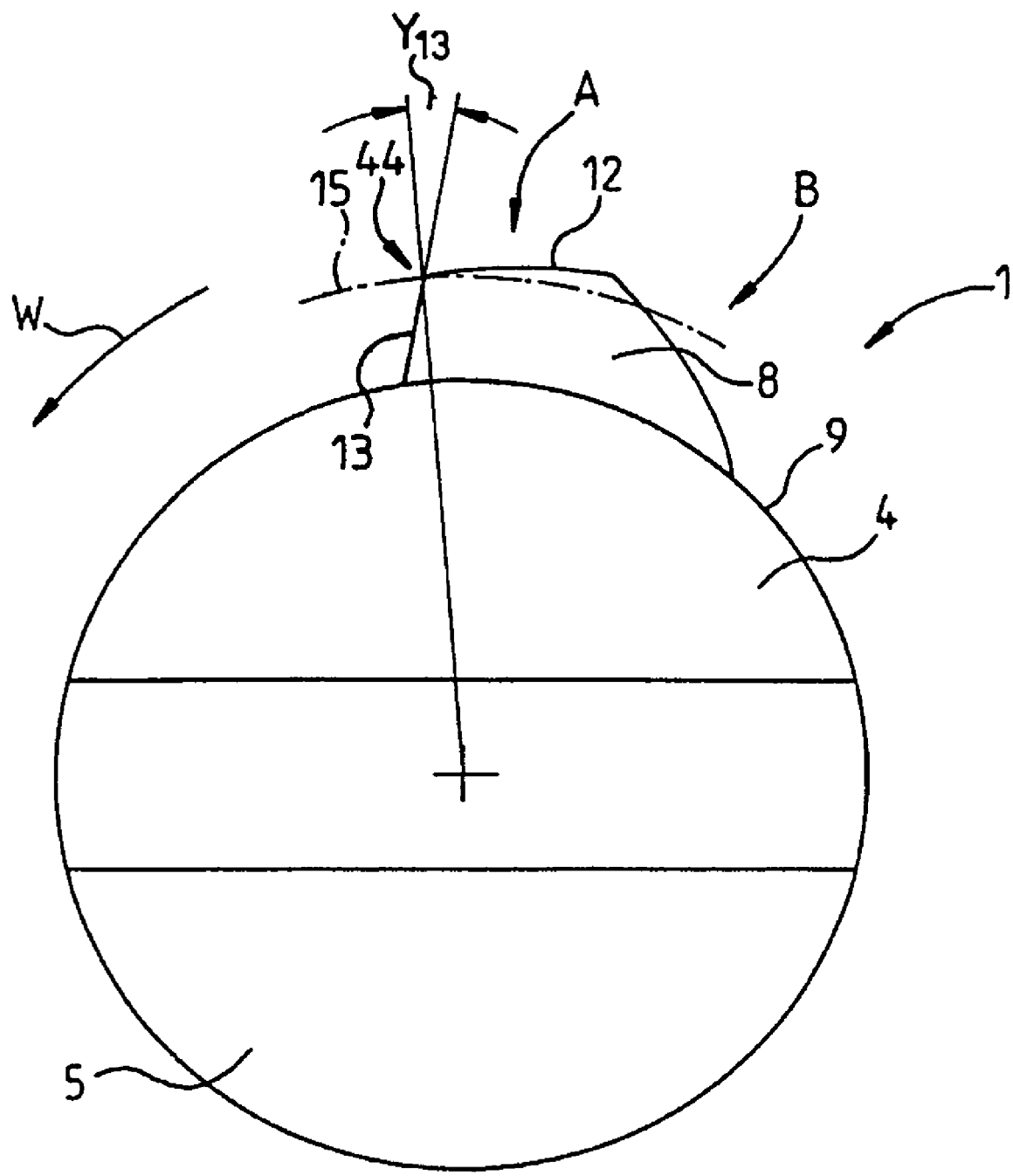
FIG. 2 shows a schematic front-end view of a further tool.

A schematic side view of a further tool 1 according to the invention is shown in FIG. 2. Arranged on a spring arm 4 is a cutting member 8 which has a cutting face 13 with a negative rake angle $\gamma_{13}$, and following this cutting face 13 is a lateral surface 12 which, in a first region A, moves in a spiral-like manner away from a cylindrical circumferential surface 9 of the spring arm 4 against a rotation direction w. Shown for comparison is a circular arc 15, which runs equidistantly from the cylindrical circumferential surface 9 of the spring fork 4. In a second region B, the cutting member 8 merges in a curved shape into the spring fork 4. In the region A, the lateral surface 12 is preferably produced by a swing-frame grinding process, the lateral surface 12 being made by a reciprocating movement of the tool 1 and/or of the grinding tool over an angle of approximately 30°.

Figure 3:
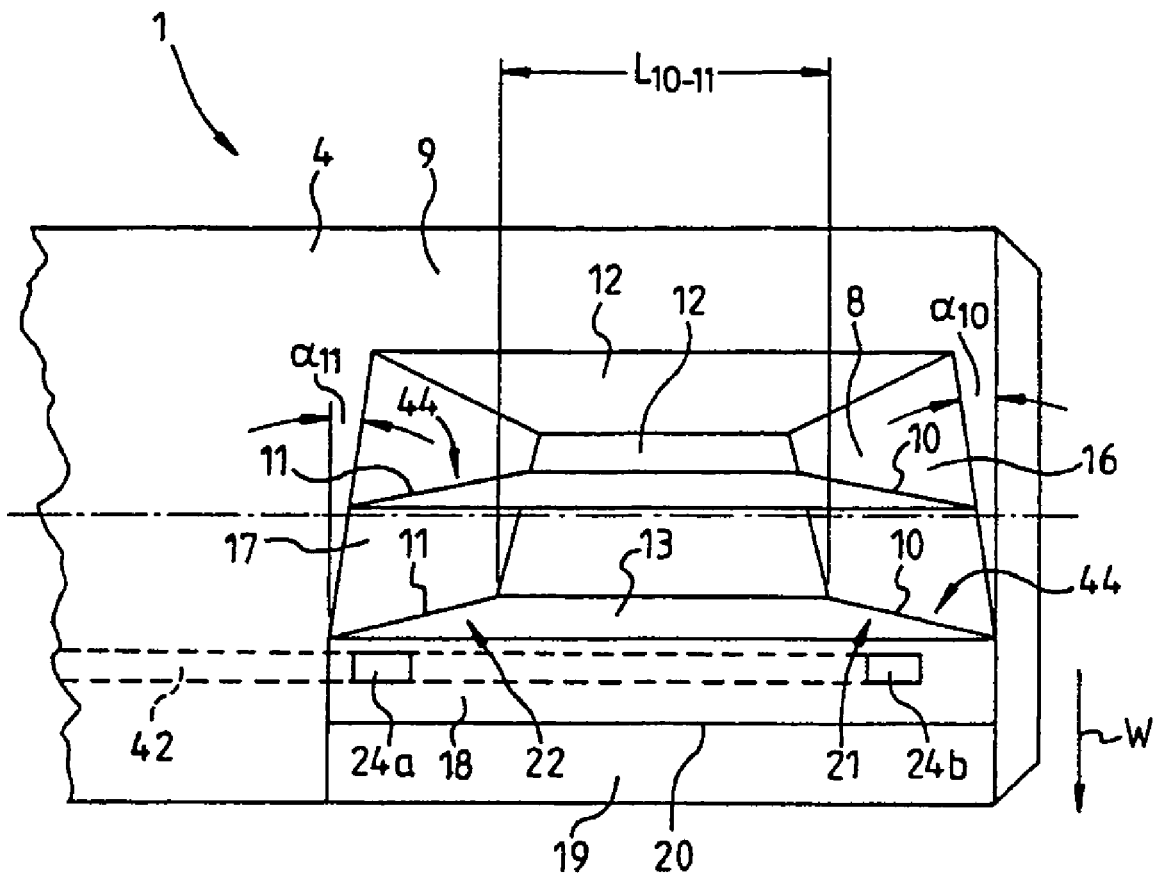
FIG. 3 shows a plan view of a tool in the region of the cutting element.

Shown in FIG. 3 is a schematic plan view of a cutting member 8 which is arranged on a spring fork 4 of a tool 1 according to the invention. The cutting member 8 has two cutting edges 10 and 11 which rise from a cylindrical circumferential surface 9 of the spring fork 4 to a lateral surface 12, the lateral surface being arranged by a cutting face 13, lying between the cutting edges 10 and 11, and flanks 16 and 17 assigned to the cutting edges 10 and 11. Located in front of the cutting face 13 against the rotation direction w is a ground surface 18 which is produced by a grinding operation for producing the cutting face 13. Adjoining the ground surface 18 is a further ground surface 19, which is made in order to chamfer a step 20 formed by the first ground surface 18. Relative to the flanks 16 and 17, the cutting edges 10 and 11, respectively, have clearance angles $\alpha_{10}$ and $\alpha_{11}$, respectively, which lie approximately within a range of 6° to 12° and are preferably identical. The two cutting edges 10 and 11 or lips 21 and 22 formed by them are spaced apart by the lateral surface 12, the distance $L_{10-11}$ in a tool having a diameter $d_1=4.4$ mm being approximately 1 mm to 1.5 mm. A cooling line 42 passing through the tool 1 and having outlet openings 24a and 24b opens out in the region of the lips 21, 22. The cooling line 42 preferably runs from the shank 3 of the tool 1 right into the region of the cutting member 8.

Figure 4:
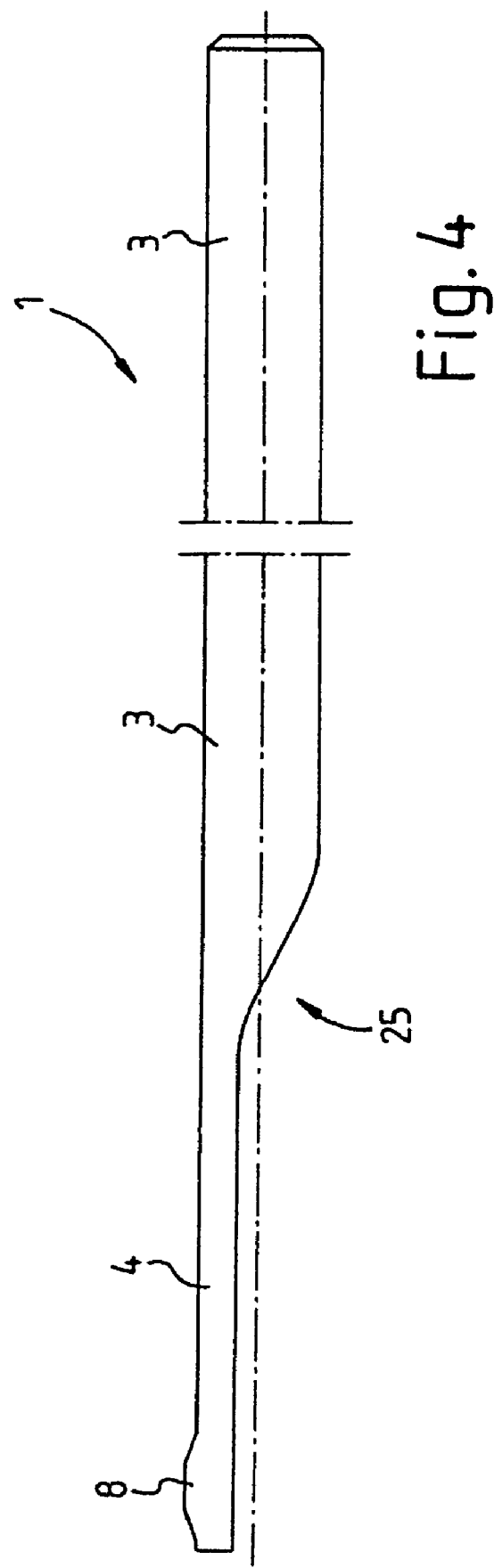
FIG. 4 shows a schematic longitudinal section of a tool having one spring arm.

Shown in FIG. 4 is a tool 1 having a spring arm 4 on which a cutting member 8 is arranged. The tool 1 is made in one piece from carbide. The tool 1 narrows in a transition region 25, in which a shank 3 merges into the spring arm 4. The elasticity of the spring arm 4 and the yielding capacity of the cutting member 8 are essentially determined by the length of the spring arm, the thickness of the spring arm and the configuration of the transition region 25.

Figure 5:
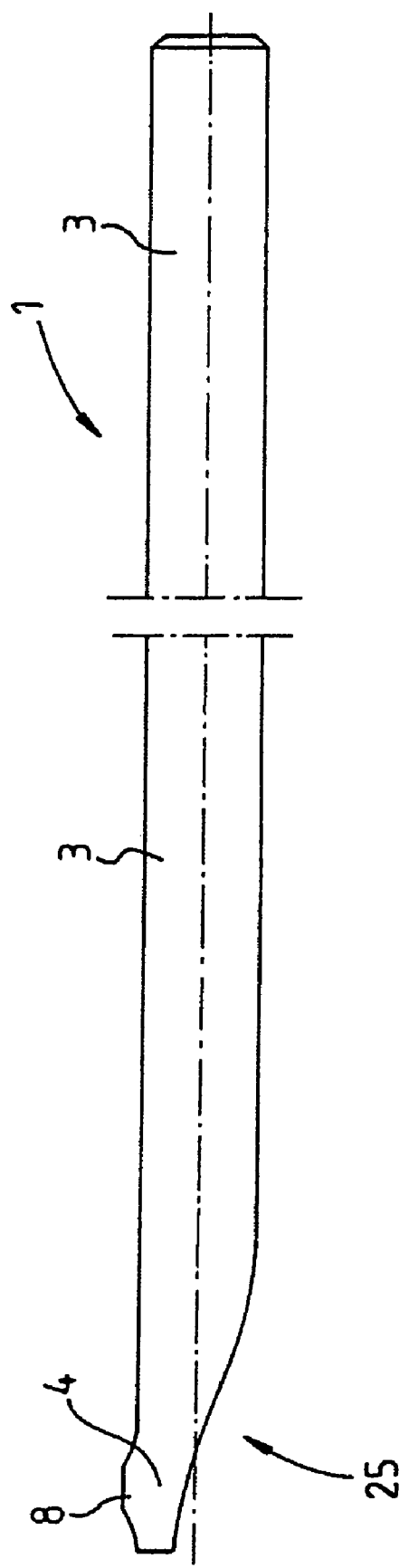
FIG. 5 shows a schematic longitudinal section of a further tool having one spring arm.

Shown in FIG. 5 is a further tool 1 which has only one spring arm 4. The spring arm 4 holds a cutting member 8. Compared with the tool shown in FIG. 4, the spring arm 4 is considerably shortened. A transition region 25 is designed in a similar manner to the transition region shown in FIG. 4.

When deburring a through-hole, the tool according to the invention acts in such a way that the start of the hole is deburred with the cutting edge 10 and then the lateral surface 12, slightly increasing in size in section A, of the cutting member, in interaction with the start of the hole or the wall of the hole, effects smooth spring deflection of the spring fork 4 relative to the longitudinal axis l of the tool, so that the cutting edges are disengaged. After the lateral surface of the cutting member emerges from the end of the hole, the cutting edge 11 abuts against said end and deburrs it. During the retraction of the tool from the hole, the lateral surface 12 of the cutting member again effects smooth spring deflection of the spring fork 4, so that the tool can be retracted from the wall of the hole without damage.

Shown in FIGS. 6a to 6c are various views of a tool 1 in which the spring arms 4 and 5 are connected by a web 26 at their front ends 7 and 28, respectively. The spring arm 4 holds a cutting member 8 in a center region $M_4$ in which said spring arm is not supported by the web 26 against the second spring arm 5. In the center region $M_4$, in which the cutting member 8 is arranged, the spring arm 4, with the cutting member 8, can be deflected slightly toward a longitudinal axis l of the tool 1, since a slot 6 is arranged in this region between the spring arms 4 and 5. The tool 1 is of three-piece design and consists of a tip S comprising the spring arms 4 and 5, an extension piece V, which is formed by a center region of the shank 3, and a clamping end E, which is formed by an end region of the shank 3. The cutting member 8 is designed essentially in a similar manner to the cutting member shown and described in FIG. 1b. Passing through the shank 3 along the longitudinal axis l is a cooling passage 23, which opens into the slot 6. In this respect, see in particular the sectional illustration in FIG. 6b (sectioned areas are not hatched for the sake of clarity).

Shown in FIGS. 7a to 7c are various views of a further tool 1 which has three freely oscillating spring arms 4, 5 and 27. Free ends 7, 28 and 29 of the spring arms 4, 5 and 27 point in a feed direction x of the tool 1. The spring arms 4, 5 and 27 are separated from one another by a slot 6 of Y-shaped cross section. The latter allows spring deflection of the free ends 7, 28 and 29 of the spring arms 4, 5 and 27 in the direction of a longitudinal axis l of the tool 1. Each spring arm 4, 5 and 27 has a respective cutting member 8, 30 and 31. The cutting members 8, 30 and 31 are uniformly distributed over the circumference of the tool 1. At the free ends 7, 28 and 29, lateral surfaces $F_4$, $F_5$ and $F_{27}$ of the spring arms 4, 5 and 27 in each case merge via a bevel 32 into end faces $S_4$, $S_5$ and $S_{27}$, respectively. The cutting members 8, 30 and 31 are designed essentially in accordance with the cutting member shown and described in FIG. 1b. The tool 1 has a cooling passage 23, which opens into the Y-shaped slot 6.

Shown in FIGS. 8a and 8b is a tool 1 having two spring arms 4 and 5 which at the free ends 7 and 28 in each case hold a partly spherical cutting member 8 and 30, respectively.

Shown in FIGS. 9a and 9b is a tool 1 having two spring arms 4 and 5 which point with free ends 7 and 28 in a feed direction x of the tool 1. The spring arm 4 holds a cutting member 8. The spring arms 4 and 5 have lateral surfaces $F_4$ and $F_5$, which merge into end faces, $S_4$ and $S_5$ via radii 33.

Figure 10:
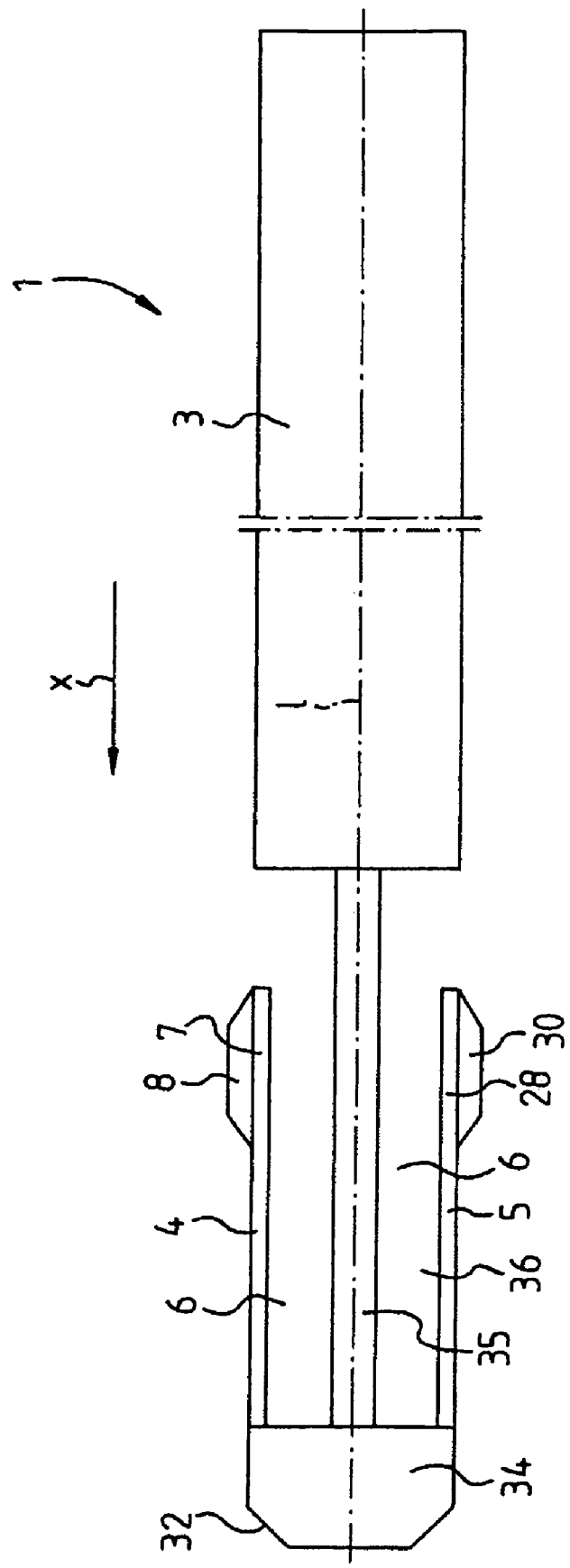
FIG. 10 shows a longitudinal section of a tool having two spring arms, the free ends of which point in the direction of the shank.

Shown in FIG. 10 is a tool 1 in which spring arms 4 and 5 are oriented with free ends 7 and 28 against a feed direction x. The spring arms 4 and 5 are integrally formed on a head 34 which is connected to a shank 3 via a neck 35. There is a clearance space 36 in the form of slots 6 between the spring arms 4 and 5 and the neck 35, and this clearance space 36 allows spring deflection of the spring arms 4 and 5 in the direction of a longitudinal axis l of the tool 1. A respective cutting member 8 or 30 is arranged in the region of the free ends 7 and 28 of the spring arms 4 and 5. The head 34 of the tool 1 has a bevel 32 in a similar manner to those spring arms of other tools which point in the feed direction.

Figure 11A:
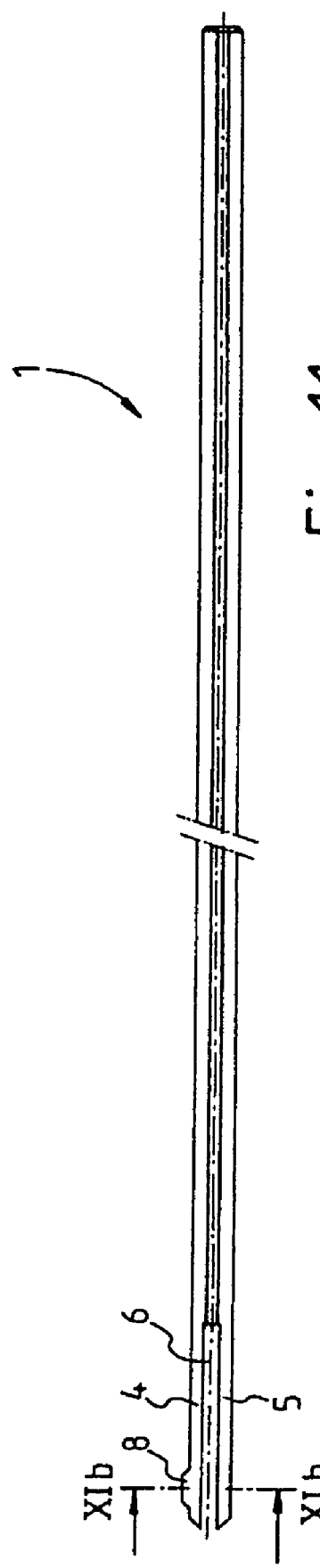
FIGS. 11a-11c show a further tool having two spring arms and one cutting member.
Figure 11C:
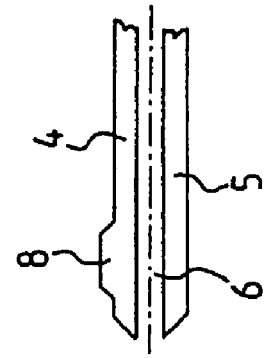
Figure 11B:
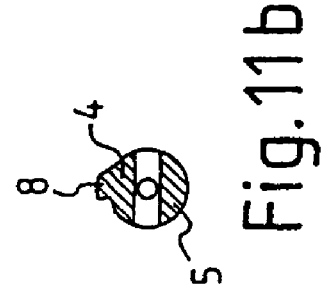
Figure 12A:
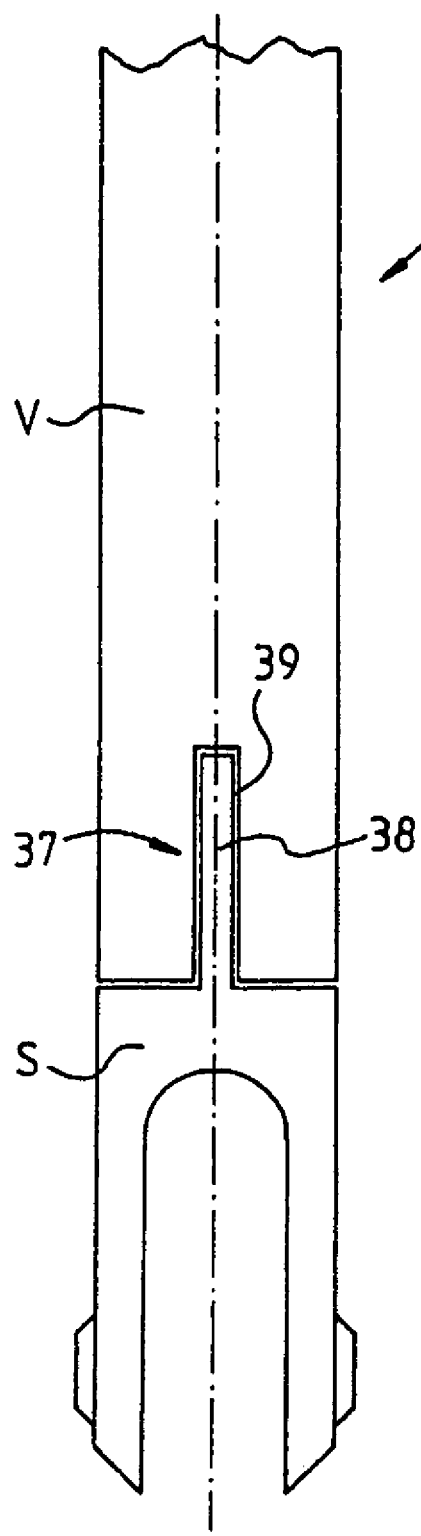
FIGS. 12a-12b show schematic partial views of two tools having push-in connections.

FIGS. 11a and 11b show views of a further tool 1 which has two freely oscillating spring arms 4 and 5 which are spaced apart by a slot 6. Only the spring arm 4 holds a cutting member 8. Schematically shown in FIG. 12a is part of a tool 1 in which a tip S is connected to an extension piece V by means of a fit 37. To this end, the tip S has a pin 38 which sits with a press fit in a hole 39 of the extension piece V. According to an embodiment variant which is not shown, provision is made for the tip and the extension piece to be held together securely by a clamping screw which sits in a tapped hole of the extension piece.

Figure 12B:
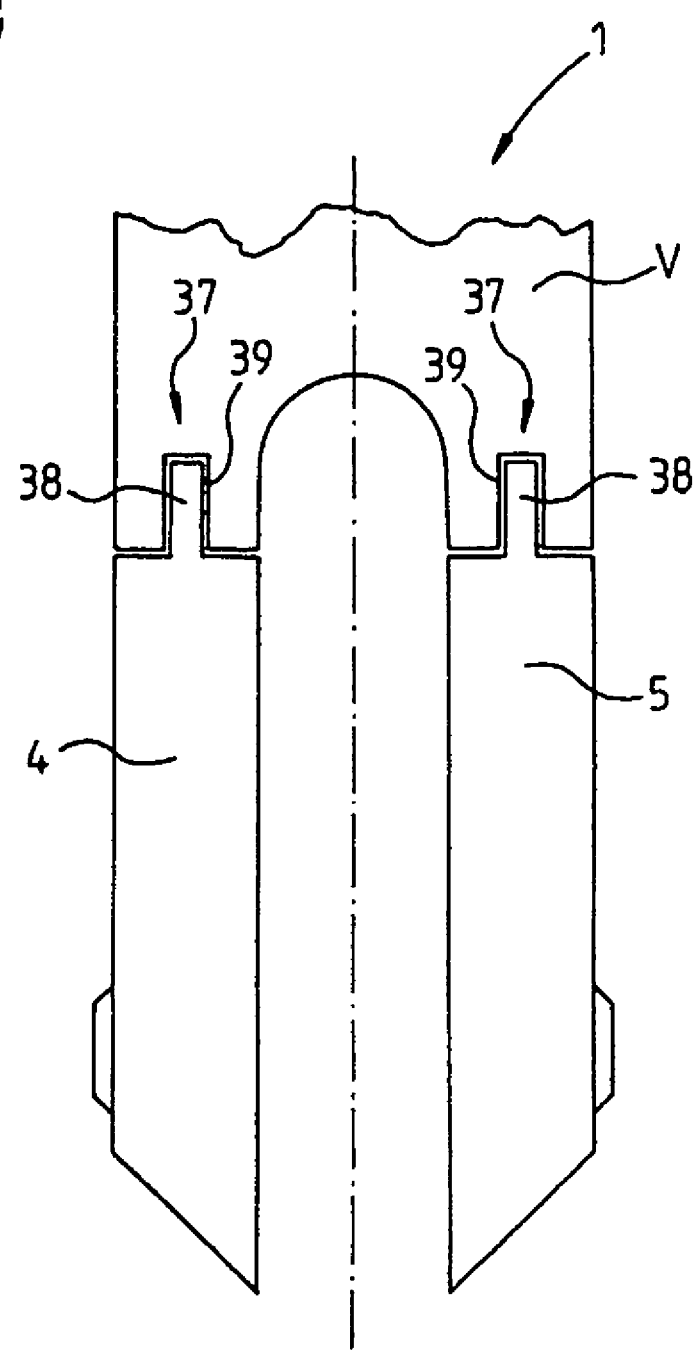

Part of a further tool 1 is schematically shown in FIG. 12b. In the tool 1, the spring arms 4 and 5 are arranged on an extension piece V via fits 37. To this end, a pin 38 is integrally formed on the respective spring arms 4 and 5 and sits in a respective hole 39 of the extension piece V. This construction also permits the exchange of an individual defective spring arm. According to an embodiment variant which is not shown, in particular the use of a clamping taper is also provided for connecting the individual parts.

Figure 13:
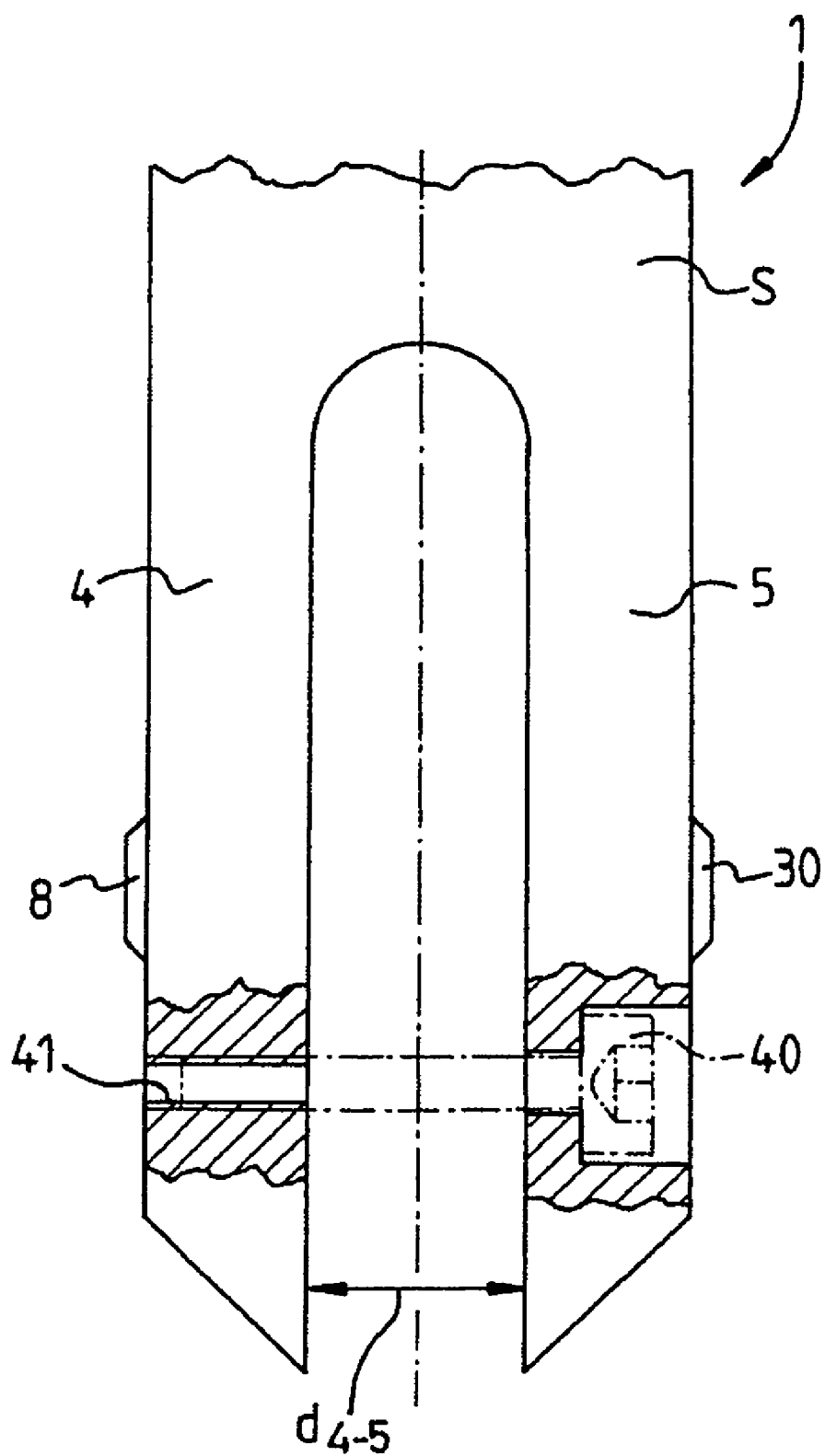
FIG. 13 shows a schematic partial view of a tool, the spring arms of which are braced by means of a screw.

FIG. 13 shows a schematic view of a tip S of a tool 1. The tool 1 has two spring arms 4 and 5 which hold cutting members 8, 30. Instead of being connected by a web (see FIGS. 6a to 6c), the spring arms 4 and 5 are connected by a screw 40 which is screwed into a tapped hole 41 arranged in the spring arm 4. The distance $d_{4-5}$ between the spring arms 4 and 5 can be set by means of the screw 40, so that setting of the effective diameter of the tool 1 is possible.

Figure 14A:
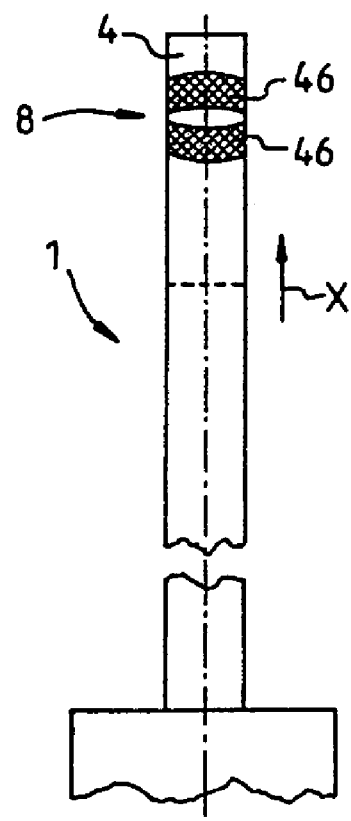
FIGS. 14a-14c show a schematic tool having lip leading edges arranged on curved lateral surface sections of the cutting element.
Figure 14B:
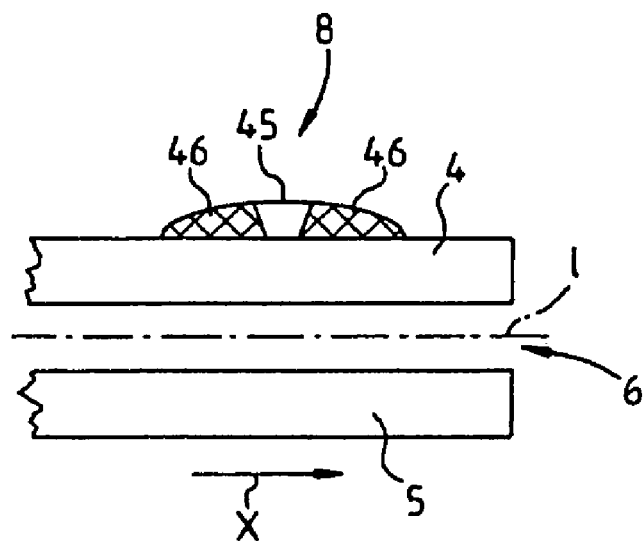

Various views, in particular detailed illustrations, of a further deburring fork are presented in FIG. 14. In this variant of the invention, the cutting member 8 has two cutting faces 46 which comprise numerous cutting edges and between which a sliding surface 45 without cutting edges is arranged. For the sake of clarity, the numerous cutting edges are not designated in any more detail in FIG. 14. The cutting edges essentially correspond to the cross hatching shown, i.e., in this variant of the invention, there are cutting edges essentially crossing one another perpendicularly. Consequently, a plurality of cutting edges are arranged one behind the other in the direction of rotation or cutting direction w. Accordingly, a plurality of cutting edges are also arranged in the feed direction x or in the opposite direction to it.

The cutting faces 46 of the cutting member 8 according to FIG. 14 are designed as arched or curved lateral surfaces 46 of the cutting member 8. The lateral surface 46 nearest to the end face of the tool is oriented in feed direction x, so that a hole is advantageously deburred when adjusting the tool in feed direction x. The lateral surface 46 extends over a radial region having widely varying radii, so that even slight out-of-roundness of the hole or of the burr does not lead to any impairment of the deburring operation.

The lateral surface 46 remote from the end face of the tool is oriented in the direction of the shank or against the feed direction x, so that the hole can be deburred during an adjustment against the feed direction x.

Figure 14C:
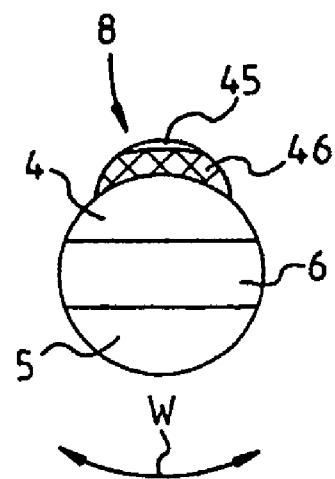

FIG. 14c illustrates in particular that the sliding surface 45 projects radially beyond the cutting faces 46. This ensures that, when the tool passes through the hole, the lateral surface of the hole is not impaired. When the tool passes through the hole, in particular the elastic spring arm 4 is moved or bent in the direction of the rotation axis l. After the tool has passed through the hole, the spring arm 4 moves back into its original initial position or rest position, so that the tool, by means of the lateral surface 46, which is oriented toward the shank, can deburr the rear side of the workpiece.

Shown in FIG. 14 is a deburring fork 1 having a lip holder or spring arm 4 which has a cutting member 8.

The second spring arm 5 shown in FIG. 14 has no cutting member in this variant of the invention.

Without showing this in any more detail, the spring arm 5 may also be designed as a lip holder with cutting member 8. The cutting member (not shown in any more detail) of the arm or holder 5 could be realized in accordance with the cutting member 8 shown in FIG. 14.

A plurality of variants of cutting edge arrangements according to the invention are shown in FIG. 15. FIG. 15a corresponds essentially to the variant according to FIG. 14. A plurality of cutting edges 44 oriented essentially parallel to one another and at an angle to the rotation axis l are shown in FIG. 15b. The cutting edges 44 are at different distances apart. On account of their oblique or angular orientation, the cutting edges 44 are arranged one behind the other both in the cutting or rotation direction w and in the feed direction x.

Shown in FIG. 15c is a cutting member 8 according to the invention which likewise has a plurality of cutting edges 44 per lateral surface 46. The cutting edges 44 according to FIG. 15c have a zigzag course, sections being provided which are oriented in the direction of the rotation axis 1 or the feed direction x and cutting sections being provided which are oriented in the cutting or rotation direction w. Accordingly, in this variant of the invention too, a plurality of cutting edges 44 or cutting sections of the cutting edges 44 are arranged one behind the other both in the cutting or rotation direction and in the feed direction x.

In FIG. 15d, a plurality of cutting edges 44 of the cutting member 8 are arranged on a lateral surface 46 in such a way that they intersect one another essentially perpendicularly. In contrast to the variant according to FIG. 15a, the cutting edges 44 according to FIG. 15d are not oriented obliquely relative to the rotation axis 1, but are oriented partly in the direction of the rotation axis 1 and partly in the cutting or rotation direction w. Accordingly, in this variant of the invention too, a plurality of cutting edges are arranged one behind the other in both the direction of the rotation axis 1 and transversely to the direction of the rotation axis 1.

Two detailed illustrations of an embodiment according to the invention are presented in FIG. 16, where a slot 47 is not arranged centrally or in the region of the rotation axis 1, as in the exemplary embodiment according to FIG. 14, but is arranged eccentrically. In addition, the slot 47, in contrast to the slot 6 according to FIG. 14, is not of straight design; but is designed with a bend. That is to say that a lateral surface of the slot 47 has a wedge-shaped contour in the front-end illustration according to FIG. 16b. A correspondingly wedge-shaped slot 47 is produced, for example in a carbide tool, in such a way that in each case material is ground out from one side up to about the center of the slot 47 and then the second half of the slot 47 is ground out from the other side at a corresponding angle. In this case, it is advantageous that the grinding tool can be advantageously positioned at the tool. On the other hand, the spring arm 4 can be designed to be comparatively compact according to this variant of the invention.

The eccentric arrangement of the slot has the advantage that a comparatively highly elastic spring arm 4 or lip holder 4 can be realized, especially at larger diameters of the basic body. The spring arm 5 according to FIG. 16 is virtually nonelastic at diameters of the basic body of about 20 mm. In addition, in this variant of the slot 47, especially at large diameters of the tool, relatively little material is removed for producing the slot 47. This reduces the production outlay and also the costs for the tool.

In particular at comparatively large diameters, a plurality of eccentric slots 47 could also be provided in such a way that a plurality of relatively highly elastic spring arms 4 having cutting members 8 are arranged in a distributed manner on the circumference of the basic body. For example, a total of three spring arms 4 having a respective cutting member 8 can advantageously be arranged at an angle of about 120 degrees to one another. In this case, especially uniform loading of the tool during the deburring can be realized.

The invention is not restricted to the exemplary embodiments shown and described. On the contrary, it comprises developments of the invention within the scope of the patent claims. In particular, the invention provides for tools having diameters $d_1$ of about 2 mm to 20 mm or larger. Slot lengths $L_6$ of about 6 mm to 35 mm are provided within this diameter range, rather shorter slot lengths $L_6$ being provided in the case of hard material and rather longer lengths $L_6$ being provided in the case of soft material in order to correctly match the contact pressure of the cutting edges on the material to be machined. According to the invention, in addition to carbides, the materials PCD and CBN are also used for producing the cutting member, the spring arm and the shank.

LIST OF DESIGNATIONS

1 Tool (deburring fork)
2 Cylindrical body
3 Shank
4,5 First spring arm, second spring arm
6 Slot
7 Free or front end of 4
8 Cutting member
9 Cylindrical circumferential surface of 4
10, 11 Cutting edge
12 Lateral surface of 8
13 Cutting face
14 Edge between 12 and 13
15 Circular arc
16, 17 Flank at 10, flank at 11
18, 19 First ground surface, second ground surface
20 Step
21, 22 First lip, second lip
23 Cooling passage
24 Outlet opening of 23
25 Transition region from 3 to 4
26 Web
27 Third spring arm
28 Free or front end of 5
29 Free or front end of 27
30 Second cutting member
31 Third cutting member
32 Bevel
33 Radius
34 Head
35 Neck
36 Clearance space
37 Fit
38 Pin
39 Hole
40 Screw
41 Tapped hole
42 Cooling line
43 Cooling opening
44 Cutting edge
45 Sliding surface
46 Cutting face
47 Slot
l Longitudinal axis of 1
$d_1$ Diameter of 1
$d_{5-4}$ Distance between 4 and 5
x Feed direction of 1
$L_1$ Length of 1
$L_6$ Length of 6
$L_8$ Length of 8
$H_8$ Height of 8
$\alpha_{9-10}$ Angle between 9 and 10
$\alpha_{9-11}$ Angle between 9 and 11
$\alpha_{10-11}$ Angle between 10 and 11
w Rotation direction of 1
A, B First section of 12, second section of 12
E Plane perpendicular to 1
$\gamma_{13}$ Negative rake angle of 13
$\alpha_{10}, \alpha_{11}$ Clearance angle at 10, clearance angle at 11
S Tip of 1

V Extension piece
E Clamping end
$F_4$ Lateral surface of 4
$F_5$ Lateral surface of 5
$F_{27}$ Lateral surface of 27
$M_4$ Center region of 4
$S_4$ End face of 4
$S_5$ End face of 5
$S_{27}$ End face of 27

The invention claimed is:

1. A tool for deburring holes, comprising
a basic body with a clamping shank, a spring arm without a cutting element, and at least one lip holder elastically movable relative to the clamping shank, the lip holder having at least one cutting element which projects radially with respect to the rotation axis of the tool and having at least one lip which, when viewed in cross-section through a plane perpendicular to the rotation axis of the tool, comprises a leading edge oriented at a negative rake angle relative to a radial line extending from the rotation axis of the tool, a trailing edge, and a lateral surface extending between the leading and trailing edges,
wherein the lateral surface is located at a constant radial distance from the outer surface of the lip holder,
wherein the lip holder and the spring arm are spaced apart from one another by a slot extending through the basic body and running in a direction of a longitudinal axis of the clamping shank, and
wherein the tool is made entirely of carbide.

2. The tool as claimed in 1, wherein at least one lip of the cutting element is made of PCD.

3. The tool as claimed in claim 1, wherein at least two lips are provided.

4. The tool as claimed in claim 1, wherein the tool has at least two lip holders.

5. The tool as claimed in claim 1, wherein at least one cooling arrangement for cooling the tool is provided.

6. The tool as claimed in claim 1, wherein a cooling line of the cooling arrangement comprises at least one outlet opening in the region of the cutting element.

7. The tool as claimed in claim 1, wherein the lip holder is fixed on the shank of the tool.

8. The tool as claimed in claim 1, wherein the lip holder is coated with a mechanically resistant coating.

9. The tool as claimed in claim 1, wherein the lip leading edges are arranged obliquely or helically with respect to the rotation axis.

10. The tool as claimed in claim 1, comprising at least two lip leading edges, designed for the rotation direction, arranged one behind the other at least partly in the rotation direction.

11. The tool as claimed in claim 1, wherein at least one cutting section of one of the lip leading edges is oriented at least partly along the rotation direction.

12. The tool as claimed in claim 1, wherein lip leading edges are oriented essentially at an acute cutting angle to the rotation direction.

13. The tool as claimed in claim 1, wherein an intersecting course of the lips is provided.

14. The tool as claimed in claim 1, wherein lip leading edges are oriented at least partly in the direction of the shank.

15. The tool as claimed in claim 1, wherein lips are arranged at least partly on a curved lateral surface section of the cuffing element.

16. The tool as claimed in claim 1, wherein a multiplicity of lip leading edges arranged one behind the other at least partly in the rotation direction are provided.

17. The tool as claimed in claim 1, wherein a multiplicity of lip leading edges arranged one behind the other at least partly transversely to the rotation direction are provided.

18. The tool as claimed in claim 1, wherein a sliding region, projecting radially with respect to the rotation axis, of the cutting element is provided for sliding in the hole.

19. The tool as claimed in claim 18, wherein the sliding region is arranged between two curved lateral surface sections having lip leading edges.

* * * * *